US012710013B2

(12) United States Patent
Sassanelli et al.

(10) Patent No.: US 12,710,013 B2
(45) Date of Patent: Aug. 18, 2026

(54) POWER PLANT FOR CONTROLLING THE RENEWABLE ENERGY USE IN AN LNG TRAIN

(71) Applicant: NUOVO PIGNONE TECNOLOGIE - S.R.L., Florence (IT)

(72) Inventors: Giuseppe Sassanelli, Florence (IT); Giampaolo Gabbi, Florence (IT); Carmine Allegorico, Florence (IT); Giulia Rontini, Florence (IT)

(*) Notice: Subject to any disclaimer, the term of this patent is extended or adjusted under 35 U.S.C. 154(b) by 0 days.

(21) Appl. No.: 18/706,888

(22) PCT Filed: Nov. 8, 2022

(86) PCT No.: PCT/EP2022/025502
§ 371 (c)(1),
(2) Date: May 2, 2024

(87) PCT Pub. No.: WO2023/083494
PCT Pub. Date: May 19, 2023

(65) Prior Publication Data

US 2025/0043731 A1 Feb. 6, 2025

(30) Foreign Application Priority Data

Nov. 10, 2021 (IT) ........................ 102021000028562

(51) Int. Cl.
*F02C 7/36* (2006.01)
*H02J 3/46* (2006.01)

(52) U.S. Cl.
CPC .................. *F02C 7/36* (2013.01); *H02J 3/46* (2013.01); *F05D 2220/76* (2013.01);
(Continued)

(58) Field of Classification Search
CPC ......... F02C 7/36; H02J 2300/20; F25J 1/0022
See application file for complete search history.

(56) References Cited

U.S. PATENT DOCUMENTS 5,899,074 A * 5/1999 Komatsu ................... F23R 3/28
60/737
6,092,362 A * 7/2000 Nagafuchi ................ F02C 9/34
60/739

(Continued)

FOREIGN PATENT DOCUMENTS

IT 2019 0000 8367 A1 12/2020
IT 201900008397 A1 11/2022
JP 6142360 B2 6/2017

OTHER PUBLICATIONS

Al-Mohannadi, Dhabia M., et al., "Optimal utilization of natural gas in processing clusters with reduced co2 emissions through material and energy integration", May 20, 2020; available at https://onlinelibrary.wiley.com/doi/abs/10.1002/ente.201901381.

(Continued)

*Primary Examiner* — Gerald L Sung
(74) *Attorney, Agent, or Firm* — Paul Frank + Collins P.C.

(57) ABSTRACT

A power plant for controlling the renewable energy absorbed by a hybrid power train for driving a load, and in particular compressors for a liquefied natural gas (LNG), is disclosed. The power plant analyzes the health status of its parts, and in particular of the hybrid gas turbine system, that drives the load.

14 Claims, 8 Drawing Sheets

(52) U.S. Cl.
CPC ....... *H02J 2300/20* (2020.01); *H02J 2300/24* (2020.01); *H02J 2300/28* (2020.01)

(56) References Cited

U.S. PATENT DOCUMENTS

| | | | | |
|---|---|---|---|---|
| 7,526,926 | B2 | 5/2009 | Rasmussen et al. | |
| 10,208,665 | B2 | 2/2019 | Simpson | |
| 10,670,334 | B2 | 6/2020 | De et al. | |
| 2006/0283206 | A1* | 12/2006 | Rasmussen | F02C 7/268<br>62/619 |
| 2009/0260367 | A1* | 10/2009 | Martin | F25J 1/0298<br>165/96 |
| 2010/0138063 | A1* | 6/2010 | Cardinal | H02J 3/381<br>700/297 |
| 2012/0109392 | A1* | 5/2012 | Hanks | H02J 3/008<br>700/291 |
| 2013/0133480 | A1 | 5/2013 | Donnelly | |
| 2018/0306109 | A1* | 10/2018 | Marcucci | H02P 9/06 |
| 2018/0347406 | A1 | 12/2018 | Friesth | |
| 2024/0222980 | A1* | 7/2024 | Suleiman | H02J 3/381 |

OTHER PUBLICATIONS

Fioriti, Davide , et al., "LNG regasification and electricity production for port energy communities: Economic profitability and thermodynamic performance", Jun. 15, 2021.

* cited by examiner

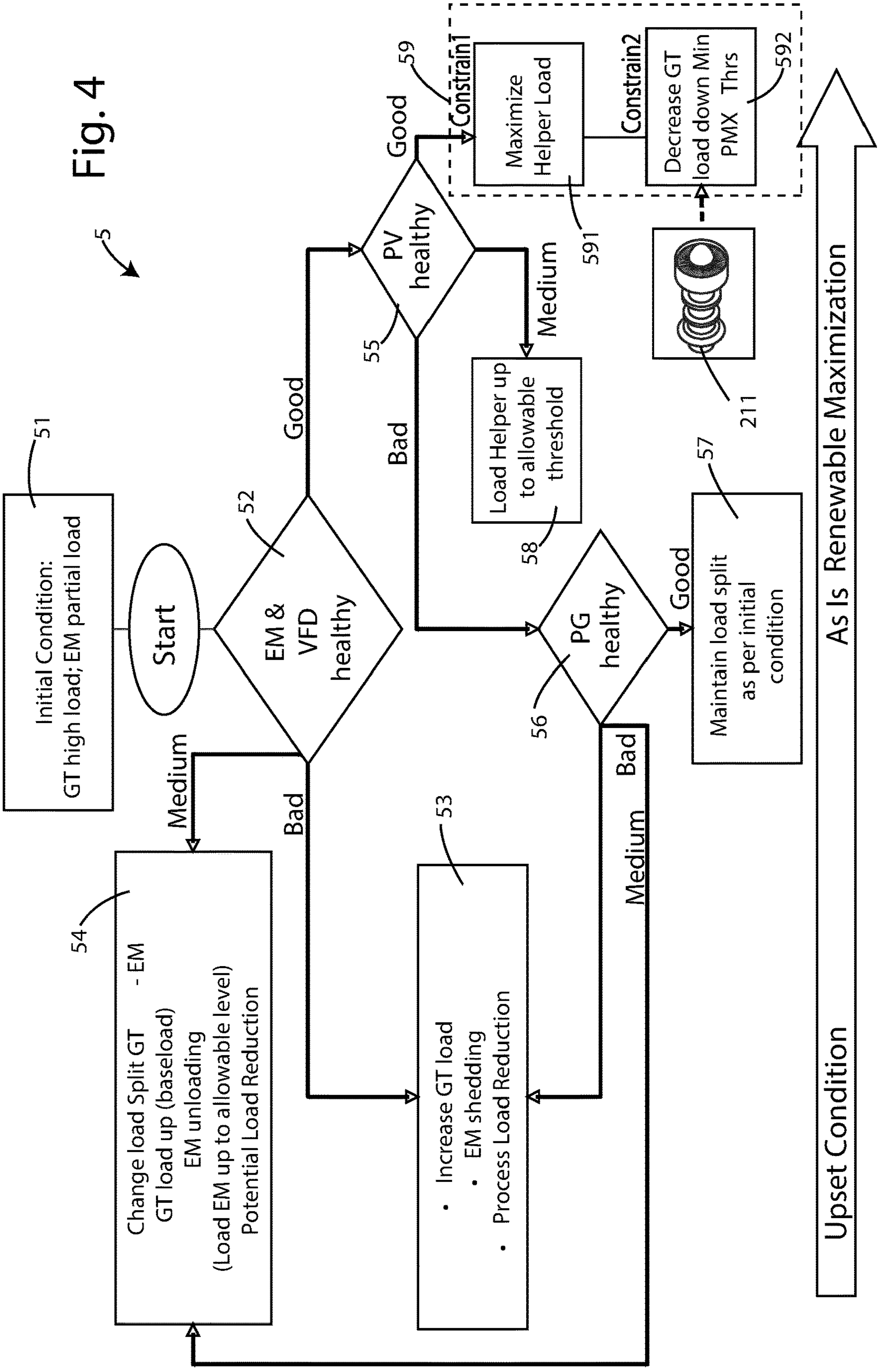

Fig. 4
5
Initial Condition:
GT high load; EM partial load
51
Start
54
Change load Split GT - EM
GT load up (baseload)
EM unloading
(Load EM up to allowable level)
Potential Load Reduction
Medium
Bad
EM &
VFD
healthy
52
Good
55
PV
healthy
Bad
Good
59
Constrain1
Maximize
Helper Load
591
Constrain2
Decrease GT
load down Min
PMX Thrs
592
Increase GT load
EM shedding
Process Load Reduction
53
Load Helper up
to allowable
threshold
58
Medium
56
PG
healthy
Medium
Bad
Good
Maintain load split
as per initial
condition
57
211
Upset Condition
As Is Renewable Maximization Electrical Motor
P EM,1 ... P EM,j ... P EM,α
VFD
P VFD,1 ... P VFD,j ... P VFD,β
51
22
23
52
Membership Function M1,1
Membership Function Mj,1
Membership Function Mα,1
Low
Medium
High
P1,1
P1,j
P1,α
M1,i
Mβ,1
Mi,j
Pi,1
P1,β
Pi,j
5211
5212
5221
5222
T em
T v+d
Rule No.
P1,1
P1,j
P1,α
P1,∂
Health Index
LOW
HIGH
MED
and
or
Then
HI_1,1
HI_1,2
HI_1,h
HI_1,a
HI_2,1
HI_2,2
HI_2,h
HI_2,a
1
2
h
a
c
524
Overall Electrical System (EM+VFD) HI
5231
5232
Membership Function
Bad
Medium
Good
M emj
M vfd
HI em
HI vfd
Change load Split GT - EM GT up (baseload)
EM down (Load EM up to allowable level)
Potential Load Reduction
Medium
53
Bad
Increase GT load
EM shedding
Process Load Reduction
54
EM & VFD healthy
52
Good

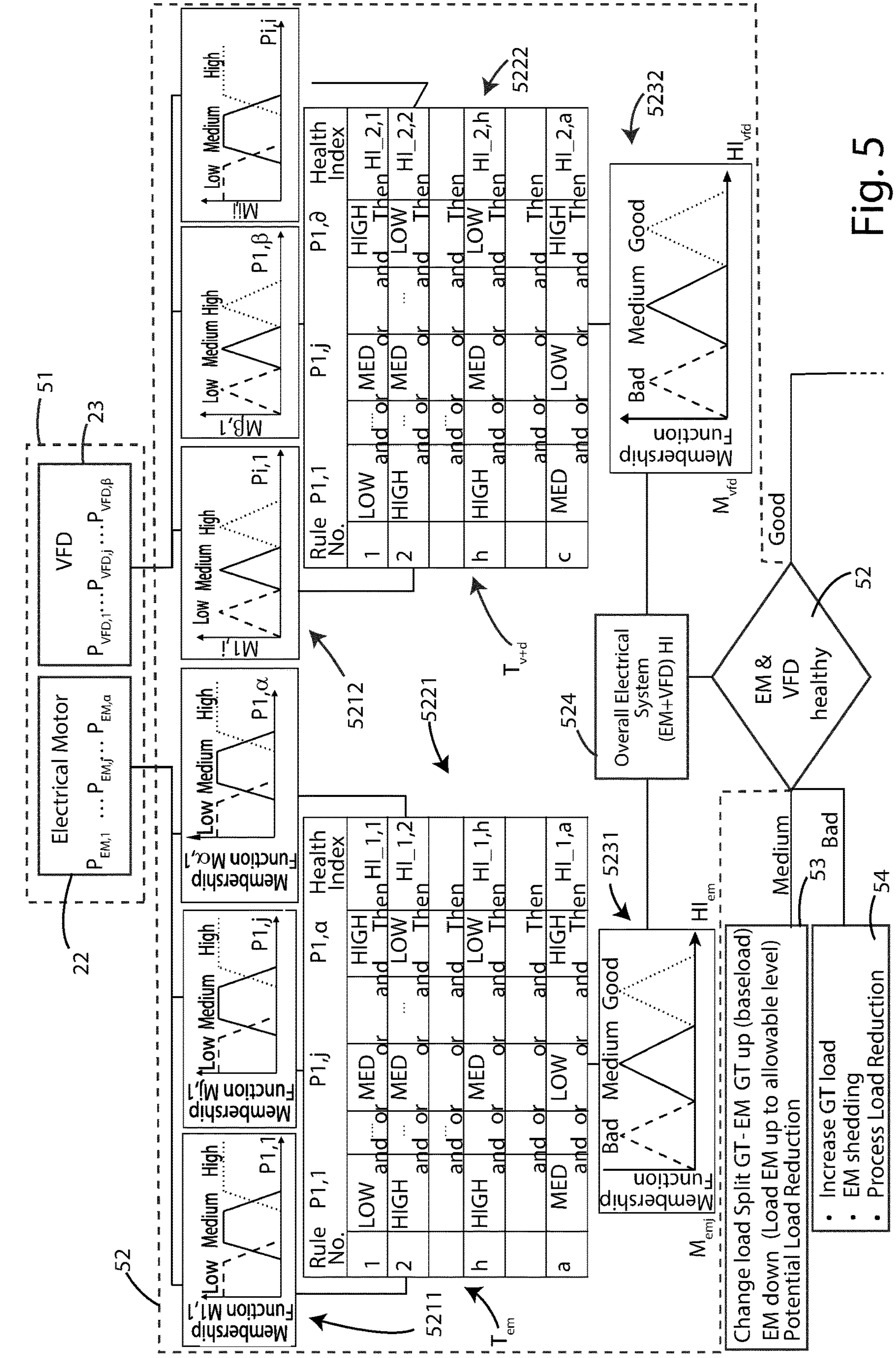

Fig. 5

Equipment_1 ($T_1$) … Equipment_i ($T_i$) … Equipment_n ($T_{11}$)

Equipment_1 ($T_1$)

| Rule No. | P1,1 | … | P1,j | … | P1,α | Health Index |
|---|---|---|---|---|---|---|
| 1 | LOW | …. | MED | … | HIGH | HI_1,1 |
| | and | or | or | and | Then | |
| 2 | HIGH | … | MED | … | LOW | HI_1,2 |
| | and | or | or | and | Then | |
| …. | … | … | … | … | … | … |
| | and | or | or | and | Then | |
| h | HIGH | … | MED | … | LOW | HI_1,h |
| | and | or | or | and | Then | |
| …. | … | … | … | … | … | … |
| | and | or | or | and | Then | |
| a | MED | … | LOW | … | HIGH | HI_1,a |
| | and | or | or | and | Then | |

Equipment_i ($T_i$)

| Rule No. | Pi,1 | … | Pi,j | … | Pi,β | Health Index |
|---|---|---|---|---|---|---|
| 1 | LOW | …. | MED | … | HIGH | HI_2,1 |
| | and | or | or | and | Then | |
| 2 | HIGH | … | MED | … | LOW | HI_2,2 |
| | and | or | or | and | Then | |
| …. | … | … | … | … | … | … |
| | and | or | or | and | Then | |
| h | HIGH | … | MED | … | LOW | HI_2,h |
| | and | or | or | and | Then | |
| …. | … | … | … | … | … | … |
| | and | or | or | and | Then | |
| b | MED | … | LOW | … | HIGH | HI_2,a |
| | and | or | or | and | Then | |

Equipment_n ($T_{11}$)

| Rule No. | Pn,1 | … | Pn,j | … | Pn,∂ | Health Index |
|---|---|---|---|---|---|---|
| 1 | LOW | …. | MED | … | HIGH | HI_2,1 |
| | and | or | or | and | Then | |
| 2 | HIGH | … | MED | … | LOW | HI_2,2 |
| | and | or | or | and | Then | |
| …. | … | … | … | … | … | … |
| | and | or | or | and | Then | |
| h | HIGH | … | MED | … | LOW | HI_2,h |
| | and | or | or | and | Then | |
| …. | … | … | … | … | … | … |
| | and | or | or | and | Then | |
| c | MED | … | LOW | … | HIGH | HI_2,a |
| | and | or | or | and | Then | |

Example

*If* Pi,1 = MED *and* Pi,j =LOW *and* Pi,k =High *Then:*
HI_2,a = True

Fig. 7

POWER PLANT FOR CONTROLLING THE RENEWABLE ENERGY USE IN AN LNG TRAIN

TECHNICAL FIELD

The present disclosure concerns a power plant operated for maximizing the use of renewable energy sources in a liquefied natural gas (LNG) plant, to increase efficiency, reduce of the overall maintenance costs, as well as to reduce the pollution introduced into the atmosphere.

BACKGROUND ART

As is well known, natural gas is one of the most important sources of energy now available in the market. It is estimated that around 30% of the world's energy demand is satisfied, directly or indirectly, by natural gas.

Normally, the natural gas is delivered by pipeline in gaseous form. However, in the past two decades Liquefied Natural Gas (LNG) plants have become much more important in the energy market. LNG is expected to play a very important role in the world's transition to cleaner (green) energy sources. This is the reason for which it is strongly fostered by central governments and several public and private bodies.

LNG is natural gas in a liquid form. To liquefy natural gas, its temperature has to be reduced up to cryogenic temperatures of approximately −160° C. As a liquid, natural gas occupies a fraction of the volume it has when extracted (it occupies around 1/600 of the volume of natural gas at atmospheric pressure), thus its transportation and storage costs turn out to be much lower and practical. LNG is also easier to transport over great distances. In this connection, it is considered that natural gas is often extracted in geographic areas where pipeline transportation is not possible.

To cool down the natural gas, several compressors have to be driven. As it is well known a compressor is a machine driven by a gas turbine to act on a refrigerator gas to raise the pressure head of a fluid. There are several different compressors available, such as centrifugal compressors, reciprocating compressors, and the like. In general, arrays of centrifugal compressors are driven.

The centrifugal compressors array of an LNG plant is typically driven by at least one gas turbine. In the last years, even because of the increasing energy demand, in addition to the gas turbine, an electric motor/generator has been added, operating on the same shaft of the gas turbine. The combination of a gas turbine and an electric motor/generator is also called a hybrid gas turbine system or hybrid gas turbine train or hybrid power train.

One of the problems of the power trains typically used in LNG plants, including the hybrid power trains, is that they emit pollutants, especially due to the operation of the gas turbine. In particular, this problem has been overcome by the hybrid power trains since the electric motor/generator can either absorb energy from a main it is connected to or introduce any excess of energy produced by the gas turbine into mains, so as to reduce the ratio of pollutant produced per Watt generated.

In fact, the electric motors/generators are also referred to as electrical reversible machines since they can also operate as a generator. The electric motors/generators are controlled by devices known as variable frequency drives (VFDs), namely devices designed to drive the electric motor/generator in any different operating condition while driving mechanical loads (either compressors or the gas turbine, e.g. for starting the same), to maximize the power transfer.

The synergy between a gas turbine and an electric motor/generator has been exploited in the past years, to reduce the pollutants released into the atmosphere.

There are available systems that control the hybrid power trains installed in LNG plants for instance by monitoring and adjusting operating variables. These systems are capable of monitoring the overall deterioration of the performance of the system over time. However, not all the parts of a hybrid power train deteriorate to the same degree. The monitoring and controlling systems available are not able to control the hybrid power trains in order to maximize the duration of the parts they are comprised of.

Accordingly, an improved hybrid power train capable of reducing pollution and reducing maintenance costs (and therefore the CAPEX) would be welcomed in the technology.

SUMMARY

The subject matter disclosed herein is a power plant operating by a method for controlling a hybrid power train, installed for instance and not necessarily in an LNG plant, or also in other kinds of plants, while driving a load, such as a compressor, a pump, or any other machine. The power plant uses one or more control signals received from the equipment and the parts of the hybrid power train, to allow the control of fuel supplying the gas turbine and the power generated or transformed by the electric motor/generator, to maximize the power to be generated, maximize the life of the gas turbine, and minimize the pollutants emissions.

The matter disclosed refers in some embodiments to a single shaft unit rigidly connected to an electric motor/generator and specifically intended for LNG production or similar high energy-intensive processes, capable of using information and variable values. The power plant operation is based on specific event-based actions, related but not limited to optimizing the availability and productions targets, such as: gas turbine diagnostic and physical-based models; dry low $NO_x$ (DLN Dry Low $NO_x$; it is DRY since the reduction of the pollutant is achieved by the combustor itself without the injection of water or steam, thus there is a WET abatement) combustion; electric/motor healthiness parameters such as partial discharge; variable frequency devices healthiness parameters, solar/wind farm healthiness parameters to anticipate the gas turbine power management.

Also, the subject matter disclosed herein is directed to a hybrid power train capable of reducing the pollution by balancing the energy derived from renewable sources, balancing the use of the latter and that produced by the gas turbines, the maximizing RTE (Round Trip Efficiency; it is referred to the overall efficiency of the process to charge the energy storage and retrieve back the energy from the storage and reuse it) of renewable and train reliability and availability, when using the renewable energy source.

The solution disclosed aims at maximizing the reliability of high energy-intensive processes, such as an LNG plant, comprising a hybrid power train, when using a renewable source, in order to enable it to take as much as possible electric power coming from renewable energies, while optimizing LNG production. Direct use of the renewable energy production plants into the LNG production optimizes the use of renewable energies and turbine emitted pollutants ($CO_2$, $NO_x$).

In one aspect, the subject matter disclosed herein is directed to a power plant operating by a method of controlling the renewable energy absorbed by a hybrid power train for driving a load. The hybrid power train comprises as equipment a gas turbine and an electric motor/generator, the latter connected to a power generation plant and to a renewable energy source. The method whereby the power plant is operated provides for the steps of detecting input parameters of each equipment before applying a first conditional statement, to determine a combined membership function. The combined membership function can have two or more qualification states as output, to check if the equipment operates correctly or not. If the equipment operates correctly, a second conditional statement is applied to the renewable energy source (such as a photovoltaic plant, a wind plant, concentrated solar power systems, and the like), so as to determine the membership functions of the same. The membership function of the renewable energy source has two or more qualification states as output, so that if the latter does not operate correctly, then a third conditional statement to the power generation plant is carried out, to check if the latter operates correctly. If so, a change of load split between the gas turbine and the electric motor/generator is carried out.

If the renewable energy source operates in a correct way, then the power generated by the gas turbine and the energy absorbed by the renewable energy source is determined according to an objective function; else, if the equipment checked does not operate correctly, then the load split between the gas turbine and the electric motor/generator is carried out.

In another aspect, the subject matter disclosed herein concerns that the equipment comprises a variable detection device connected to an electric motor/generator, and to a power generation plant, and to a renewable energy source. In the detecting step the initial condition detected is those of the electric motor/generator and the variable detection device. Also, the first conditional statement comprises the sub-steps of associating a parametric membership function to each input parameters of the electric motor/generator, combining the parametric membership functions of the electric motor/generator through a true table to obtain health indexes and then an equipment membership function, associating a parametric membership function to each input parameters of the variable frequency device, combining the parametric membership functions of the variable frequency device through a true table to obtain health indexes and then an equipment membership function. Finally, the membership function of each piece of equipment is combined, for obtaining a combined membership function having two or more qualification states as output.

In another aspect, disclosed herein is that the combined membership function can assume a first qualification state, a second qualification state, and a third qualification state. If the combined membership function assumes the first qualification state (Bad), then the gas turbine load is increased and the electric motor/generator is shed. If the combined membership function assumes the second qualification state (Medium), then the load split between the gas turbine and the electric motor/generator is changed. If the combined membership function assumes the third qualification state (Good), then the second conditional statement to the renewable energy source is applied.

A further aspect of the present disclosure is drawn to an objective function to minimize the use of the gas turbine, such that the gas turbine load remains above the combustor transfer threshold $Pmx_{Load}$, plus a load margin $\Delta_{Load}$, to handle potential load transients.

In another aspect, disclosed herein is that the input parameters are analog or digital electrical signals.

In an aspect of the present disclosure is that the power plant comprises a hybrid power train having a through a shaft, a gas turbine, mechanically connected to the shaft, an electric motor/generator, mechanically connected to the shaft, and a variable frequency device, connected to electric motor/generator, and to a power generation plant and to a renewable energy source. The variable frequency device is operable to allow the electric motor/generator to transform the energy from the power generation plant and the renewable energy source to drive the load or to help the operation of the gas turbine. The power plant also comprises a load that is mechanically connected to the shaft and plant control unit to control the hybrid power train for maximizing the energy used coming from the renewable energy source by maximizing the driving load of the electric motor/generator.

In an aspect of the present disclosure, the load comprises one or more centrifugal compressors for refrigerating the natural gas.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 4 illustrates a flowchart of the method of controlling the renewable energies use, according to a first embodiment;

FIG. 5 illustrates a flow chart of a first conditional statement of the method of controlling the renewable energies use, according to the first embodiment;

FIG. 7 illustrates a set of true tables implemented in the method of controlling the renewable energies use, according to a first embodiment;

DETAILED DESCRIPTION OF EMBODIMENTS

Liquid natural gas is an important source of energy, it is necessary to liquefy the extracted gas. To this end, several compressors are used. To drive the compressors hybrid power trains are used. A hybrid power train comprises a gas turbine and an electric motor/generator. The electric motor/generator is a machine that can be connected, among the other things, to renewable energy plants, to transform the energy produced by such plants and use the same to drive compressors, minimizing, up to an appropriate level, the use of a gas turbine, so as to reduce the pollutants emitted in the ambient.

According to one aspect, the present subject matter is directed to a method to control the renewable energy use in an LNG train, capable of guaranteeing LNG Plant/train reliable operations and avoiding negative impact on train availability when a renewable source is used to supply partially or completely the required power.

LNG production, being an energy-intensive process, can be seen as storage of renewables or a sink where every Watt produced, regardless of the moment (day, night, winter, or summer) and the quantity it is produced, can be used for the production with no need of physical storage or by minimizing it, and thus very high RTE.

Figure 1:
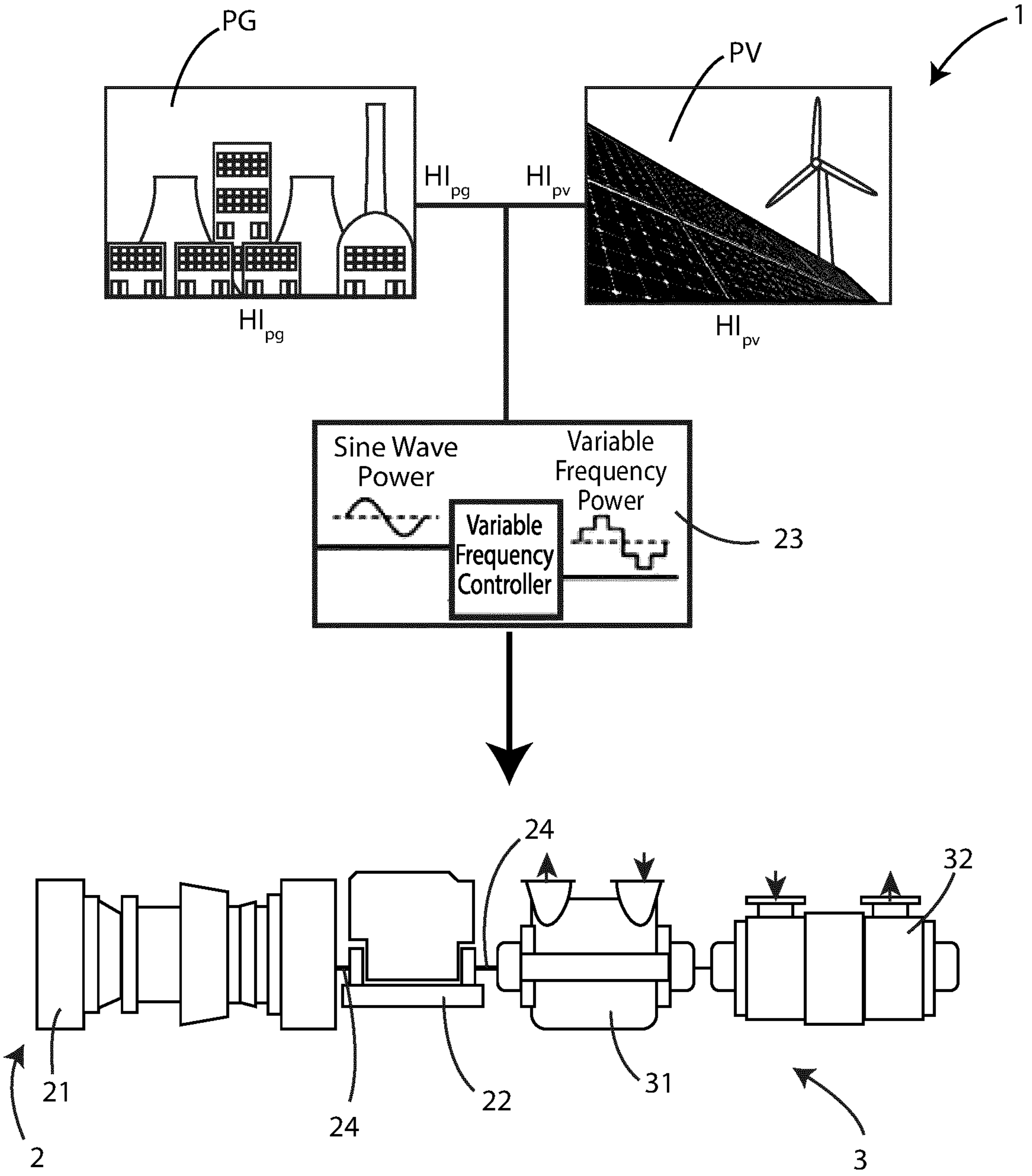
FIG. 1 illustrates a control system of a hybrid power train for controlling a load to maximize the use of renewable energy sources.

Referring to FIG. 1 an embodiment of an LNG refrigeration plant is illustrated, and it is indicated with reference number 1. The LNG refrigeration plant 1 comprises a hybrid power train 2, a load 3, connected to, and driven by the hybrid power train 2. A power generation plant PG, which can even be the mains or any usual power generation facility, and renewable energy sources in general, indicated with the reference PV, are both connected to the hybrid power train 2, as better specified below.

With renewable energy sources PV is intended for any energy plant or system capable of producing energy from renewable sources, like a photovoltaic plant, wind energy plant, a concentrated solar power system, ocean or sea waves energy plant, etc. In the following, without limiting the scope of protection of the solution described, as renewable energy sources PV will be intended a photovoltaic plant. In any case, other renewable energy production plants or a combination thereof can be considered.

The hybrid power train 2 comprises a gas turbine 21, an electric motor/generator 22, a variable frequency device (VFD) 23, connected to the electric motor/generator 22, and to the power generation plant PG and to the photovoltaic plant PV. The hybrid power train 2 also comprises a shaft 24. The gas turbine 21 and the electric motor/generator 22 are connected to the same shaft 24.

The power to the load 3 can be derived from the gas turbine 21, the power generation plant PG and/or the photovoltaic plant PV.

The load 3 shown in FIG. 1 comprises two compressors 31 and 32, for compressing in the embodiment considered the liquefied natural gas. The compressors and 32 are mechanically connected to the shaft 24. However, in other embodiments, different loads can be driven by the hybrid power train 2, such as pumps and the like, without departing from the scope of protection of the solution disclosed.

In addition, in other embodiments, the compressors are at least one or more than two, depending on the requirements of the plant.

The gas turbine 21 can be of different kinds, such as, for instance, a double-shaft gas turbine or a single shaft gas turbine. In other embodiments, other types of gas turbines can be installed.

The electric motor/generator 22 is adapted to operate as a motor, thus transforming electrical energy deriving from the power generation plant PG or from the photovoltaic plant PV in mechanical energy to drive the load 3, or to operate the as a helper, for supplying additional energy to that supplied by the gas turbine 21 required by the load 3, or as a starter, for activating the gas turbine 21. The electric motor/generator 22 can also operate as a generator, injecting any surplus energy generated by the gas turbine 21 into the power generation plant PG or the mains, for instance.

The variable frequency device 23 is the motor driving device. It is usually used in electro-mechanical drive systems to control AC motor speed and torque by varying motor input frequency and voltage. In general, the VFDs are used to improve performance through advances in semiconductor switching devices, drive topologies, simulation and control techniques, and control hardware and software.

It is seen that the lecturing motor/generator 22 and the variable frequency device 23 are the devices that manage the combination of energy to supply the load 3.

As better specified below, each component of the hybrid power train 2 is characterized by a proper health index HI. In particular, the gas turbine 21 is characterized by the health index $HI_{gt}$, the electric motor/generator 22 is characterized by the health index $HI_{em}$, the variable frequency device 23 is characterized by the health index $HI_{vfd}$, as well as the lines of the photovoltaic plant PV and the power generation plant PG can be characterized by relevant health indexes, respectively $HI_{pv}$ and $HI_{pg}$. Through the health index $HI_i$ of each piece of equipment i it is possible to associate a status to each equipment and subsystems and/or combination of equipment and subsystems to determine the status of the same in a synthetical manner and determine the most appropriate energy split to be produced.

Also, since the meaning of the above-mentioned health indexes HI will be better explained below, they allow checking the operating status of the hybrid power train as a function of the single equipment and as a plant or fleet of plants. In other words, through the health indexes HI it is possible to keep track of the current operation of the equipment of the hybrid power train 2 as well as of the hybrid power train 2 as a whole. Synthetically, the health index of the train is a function of the health indexes of the equipment, and it can be mathematically expressed as $$HI_{train} = f(H_i). \quad \text{(F1)}$$

In the following additional details will be given as to how the health indexes of the equipment will be calculated and evaluated as well as the calculation of the health indexes of the hybrid power train 2 as a whole.

In the following with equipment is indented any part of the hybrid power train 2, namely the gas turbine 21, the electric motor/generator 22, or the variable frequency device 23, as well as parts thereof.

Figure 2:
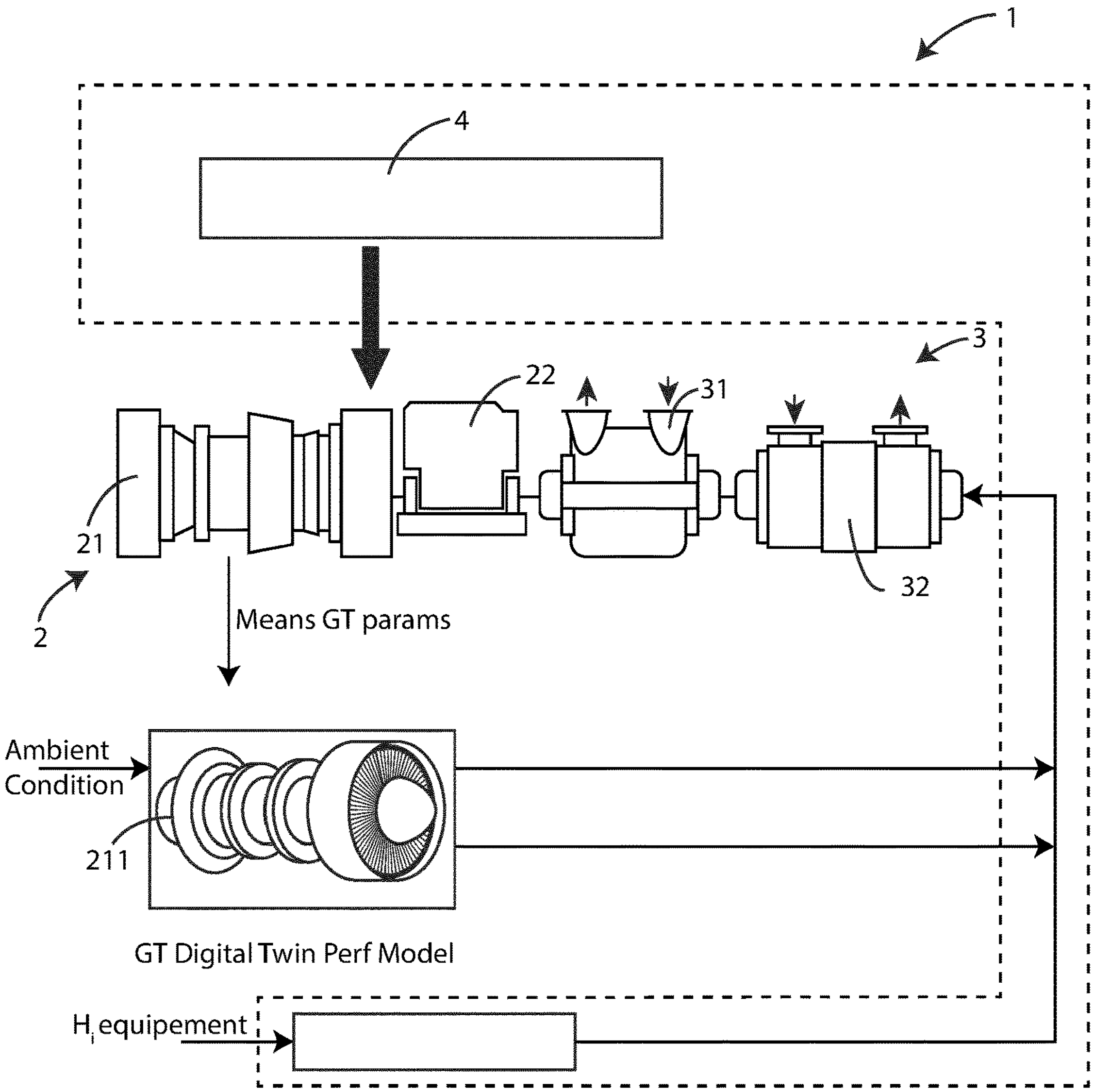
FIG. 2 illustrates a schematic of a plant hybrid power train connected to energy sources and to loads to be driven.

Referring now to FIG. 2, it is shown how the hybrid power train 2 is controlled to maximize the use of the renewable energy coming from the renewable energy source (s), namely, in the embodiment that is described, the photovoltaic plant PV. In particular, the health indexes $H_j$ of each j–th equipment are determined and introduced into a health index system to be processed in order to achieve the objective function of minimizing the use of the gas turbine 21. Such objective function can be expressed by the following formula $$\text{Objective}_{function} = \min\|GT_{Load} - (Pmx_{Load} + \Delta_{Load})\| \quad \text{(F2)}$$

where the objective function $\text{Objective}_{function}$ has the scope of driving the gas turbine 21, and the electric motor/generator 22 has the scope of maximizing the renewable energy and the maximum allowable power in the electric motor/generator 22. Also, if all the condition on the heath indexes HI are satisfied, the maximization of the photovoltaic plant PV need to target the gas turbine 21 load, such that the gas turbine load remains above the combustor "Premix"

transfer threshold $Pmx_{Load}$, plus a certain load margin $\Delta_{Load}$, to handle any potential load transient. When the gas turbine 21 load achieves the target load, the objective function $Objective_{function}$ achieves the minimum of the function. Also. The gas turbine 21 premix transfer threshold $Pmx_{Load}$ could be calculated by the gas turbine 21 digital interface 211, which is connected to the plant control unit 4. The digital interface 211 is a model (digital twin model) of the hybrid power train 2 and the ambient the latter operates, capable of representing the performance of the combined system. The digital interface 211 model can be based on artificial intelligence, machine learning, physics-based or a combination of them.

The gas turbine combustion system needs to operate in a defined operating envelope to allow premixed combustion mode. In a premixed combustion mode, the fuel and the air are perfectly mixed and the resulting is a wide region of premixed flame with reduced diffusion flame. This allows a significant reduction of pollutant formation such as $NO_x$ and CO. Premix operating envelope is limited to medium-high GT load, therefore a precise threshold below which the premix mode is not possible is calculated by the engine model to provide information to control the minimum load at which the turbine can maintain premix operation mode.

Also the load margin $\Delta_{Load}$ is kept above the premix transfer threshold to ensure to do not cross the threshold and enter in diffusion flame operation mode which produces high pollutant content.

In some embodiments, the health index processing could be done remotely or in local ("Edge") or a combination of the two.

In general, the plant control unit 4 (which can be or can be part of a local controller of a subsystem) is programmed or configured to obtain the objective function on the basis of some constraints based on the performance of the plant to be controlled, namely, in the present embodiment, the hybrid power train 2. In the embodiment illustrated in FIG. 2, the constraints are connected to the maximum energy that an electric motor/generator 22 can generate, and the power range the gas turbine 21 can work, namely $$\begin{cases} EM_{maxPower} = f(x_i \ \dots\ ) \sim \text{Const} \\ GT_{MaxPower} = \text{Output} \\ GT_{MinPower} = \text{Output} \end{cases} \quad \text{(F3)}$$

In particular, $EM_{maxPower}$ is the electric motor/generator 22 maximum power function in a health status. It is noted that some upset conditions might require a reduction in motor loading; $GT_{MaxPower}$ is the maximum power of the function of ambient temperature, engine degradation, inlet and exhaust losses, etc. The plant control unit 4 calculates the remaining load capability for the engine to be communicated to process control system; and $GT_{MinPower}$ is the gas turbine 21 minimum power, which is function of ambient temperature, engine degradation, inlet and exhaust losses, flame temperature, etc. In this case, the plant control unit 4 calculates the remaining margin to minimum load to maintain combustion mode in premix and minimize $NO_x$ emission.

As mentioned above, plant control unit 4 of the hybrid power train 2 is programmed to control the operation of the hybrid power train 2 on the basis of a specific computer program, as better detailed below. The control unit 4 is also operatively connected to the gas turbine 21, and any part or equipment thereof. In a similar manner, the plant control unit 4 is operatively connected to the electric motor/generator 22, as well as to the variable frequency device 23. Also in this case, the plant control unit 4 is programmed to control and to check parts of the electric motor/generator 22 and of the variable frequency device 23.

As mentioned above, the plant control unit 4 is programmed to run a computer program to manage a fluctuating external source (namely the renewable energy sources, like the photovoltaic plant PV), for optimizing the energy production of the gas turbine 21 and other equipment availability and reliability. Also, since the LNG refrigeration plant 1 is typically energy-intensive, the program reduces the need of storage since power is constantly needed (increased Photo Voltaic Storage Efficiency, etc.). The plant control unit 4 can be remotely connected or wire-connected to the hybrid power trains 2 of the LNG refrigeration plant 1.

The plant control unit 4 can be connected to one or more hybrid power trains 2, namely to a fleet of hybrid power trains 2. In this connection, the control unit 4 can optimize the operation of the entire fleet.

Figure 3:
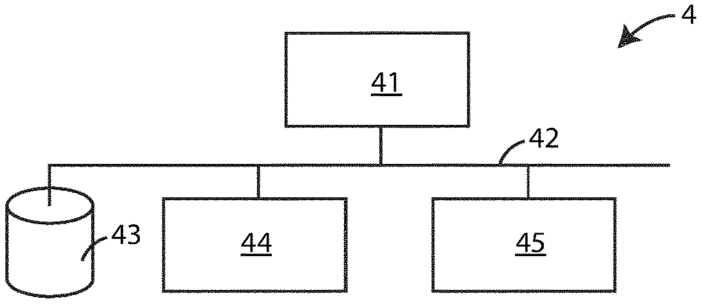
FIG. 3 illustrates a schematic diagram of the plant control unit.

In some embodiments, and particularly referring to FIG. 3, the plant control unit may include: a processor 41, a bus 42, to which the processor 41 is connected to, a database 43, connected to the bus 42, so as to be accessed and controlled by the processor 41, a computer-readable memory 44, also connected to the bus 42, so as to be accessed and controlled by the processor 41, a receiving-transmitting module 45, connected to the bus 42, for receiving and transmitting data and signals from/to the hybrid power train 2.

As mentioned above, the power control unit 4 runs a program for controlling the hybrid power train 2, in order to optimize the energy production, the energy absorbed from the renewable resources, namely, in the embodiment that is described, the photovoltaic plant PV, and therefore for reducing the emission of $NO_x$ and $CO_2$.

Referring to FIG. 4, the general method upon which the program is based for controlling the LNG plant 1 run by the plant control unit 4 is schematically illustrated.

Specifically, FIG. 4 illustrates a flowchart. The method 5 comprises (see FIGS. 4 and 5) a detecting step 51, where the real-time conditions of the hybrid power train 2 are checked. In particular, in this preliminary step, the gas turbine 21 load and the electric motor/generator 22 partial load is determined.

Specifically, the plant control unit 4, as mentioned above, is connected to the gas turbine 21, the electric motor/generator 22, and the variable frequency device 23. From each of this equipment the plant control unit 4 receives one or more input parameters $P_{ij}$, where the index i labels one or more equipment of the hybrid power train 2, while the index j labels the parameters. Each piece of equipment might be checked through different parameters. In the embodiment that is described the equipment checked are the electric motor/generator 22 and the variable frequency device 23. However, additional or different equipment can be considered for this initial checking step.

The parameters $P_{ij}$ are signals representing the equipment performance. There will be a total number of j×i parameters, namely j signals times i equipment. The parameters signals allow determining the degree of operating capability of equipment. Also, their value, shape, or spectrum is/are influenced by the need for maintenance of any specific equipment.

Figure 6:
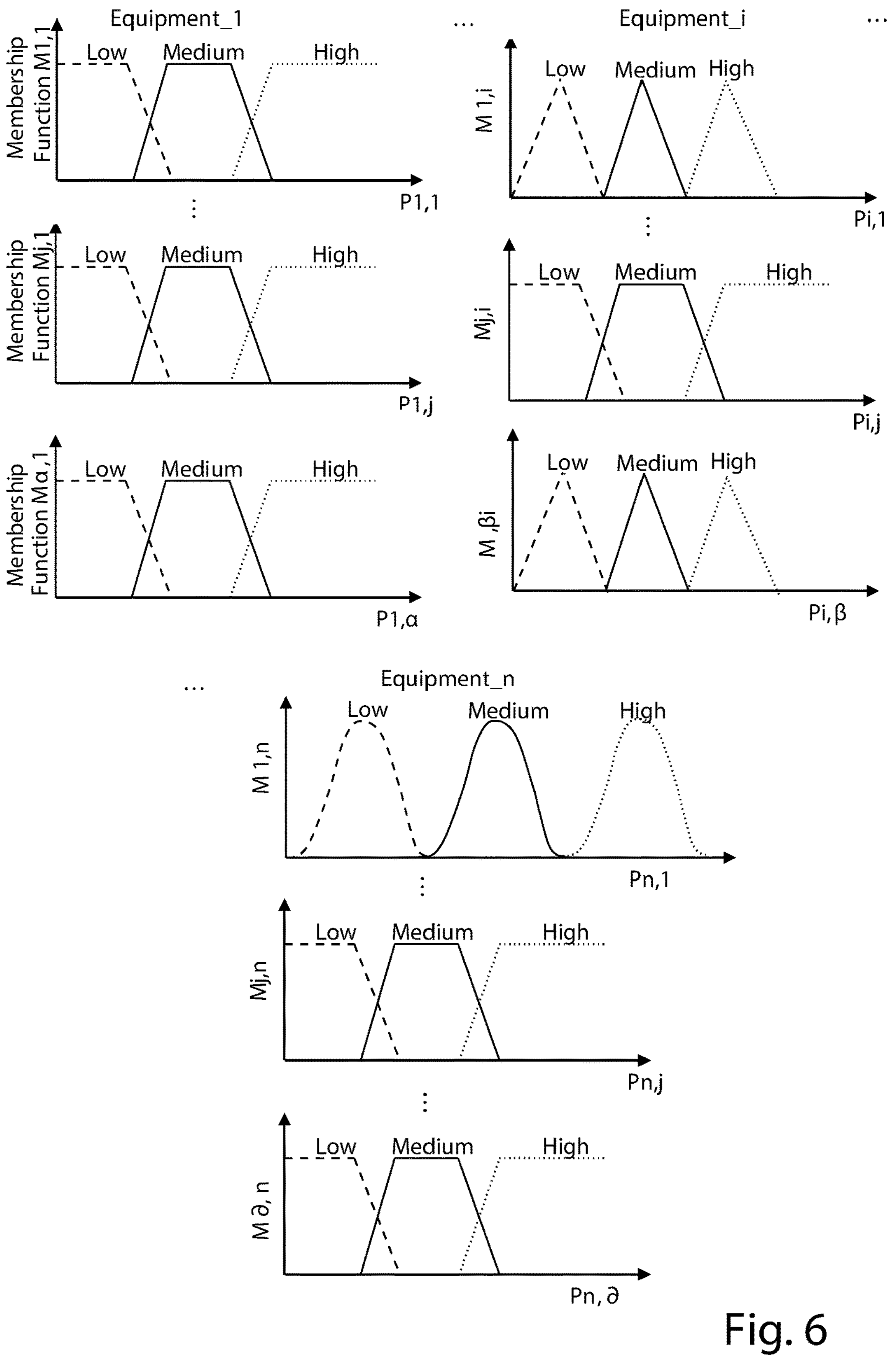
FIG. 6 illustrates a set of signals of the parameters processed by the method of controlling the renewable energies use, according to a first embodiment.

For each parameter signal $Pt_{ij}$ a parametric membership function $Mt_{ij}$ is assigned (step 5211, referring to the electric motor/generator 22), which represents the j membership function of the equipment i. Each membership function $Mt_{ij}$ can have different forms or shapes, as can be also appreciated in greater detail in FIG. 6. The parametric membership function $Mt_{ij}$ is a logic state function, which can assume in the present embodiment, three possible values or qualification states, as a function of the value of each parameter $Pt_{ij}$ signal, namely Low (equipment under analysis not operating in a proper condition), medium (equipment under analysis still operating, although not in optimal conditions), and high (equipment correctly operating). In other embodiments the membership functions $Mt_{ij}$ can assume a different number of qualification states.

Continuing referring to FIG. 5, and considering also FIG. 7, once a parametric membership function $Mt_{ij}$ is associated with the parameters $Pt_{ij}$ signals received, for each piece of equipment i, the outcomes of the parametric membership functions $M_{ij}$ are combined (5221) through true tables Ti to obtain a set of equipment health index $HI_{ij}$ for each i-th equipment, from which an equipment membership function $M_{em}$ (see step 5231).

Therefore, referring to the electric motor/generator 21, from the parameters $P_{em,j}$, membership functions $M_{em,j}$ are obtained, the true table $T_{em}$ applies combination rules to the membership functions $M_{em,j}$, to calculate the electric motor/generator health indexes $HI_{em,j}$ to obtain the membership function $M_{em}$, of the electric-motor generator 22 of the hybrid power train 2.

Likewise, referring to the electric motor/generator 22, from the parameters $P_{vfd,j}$, membership functions $MV_{vfd,j}$ are obtained, the true table $T_{vfd}$ applies combination rules to determine the health indexes $HI_{vfd,j}$ and the relevant membership functions $MV_{vfd,j}$, so as to calculate the membership function $M_{vfd}$ of the variable frequency drive 23 of the hybrid power train 2. FIG. 7 illustrates an example of line of code whereby the stages of some equipment are properly combined (see steps 5212, 5222, 5223).

The conditional statement subprocess 52, namely the membership function of each equipment, namely $M_{em}$ and $M_{vfd}$ can assume three different outputs, namely three different qualifications "fuzzy" states, here referred to as indicated as "Bad", "Medium" or "Good". More specifically, the first conditional step 52 comprises a combination sub-step 524 for obtaining a combined membership function $M_{em+vfd}$, which can still assume the three different outputs or qualification "fuzzy" states, here still referred to as "Bad", "Medium" or "Good".

In case of the combined membership function $M_{em+vfd}$ assumes the value Bad, then the electric motor/generator 22 and/or the variable frequency device 23 are not working in good technical conditions. A first set of operating actions are carried out (step 53) by the plant control unit 4. In particular, the gas turbine 21 load is increased, the electric motor/generator is shed and the entire process load is reduced.

In case of the membership function $M_{em+vfd}$ assumes the value Medium, then, although the electric motor/generator 22 and the variable frequency device 23 can still operate without affecting excessively the pollution or in any case not to compromise the operation of the hybrid power train 2, (step 54) the load split between the gas turbine 21 and the electric motor/generator 22 is changed. In some circumstances, the process load can be also reduced. In this case, it is also communicated by the plant control unit 4 the status process to regulate the overall train load based on gas turbine 21—electric motor/generator 22 load capability.

Finally, in case of the membership function $M_{em+vfd}$ assumes the value Good, the electric motor/generator 22 and the variable frequency device 23 are working in optimal or proper conditions.

Figure 8:
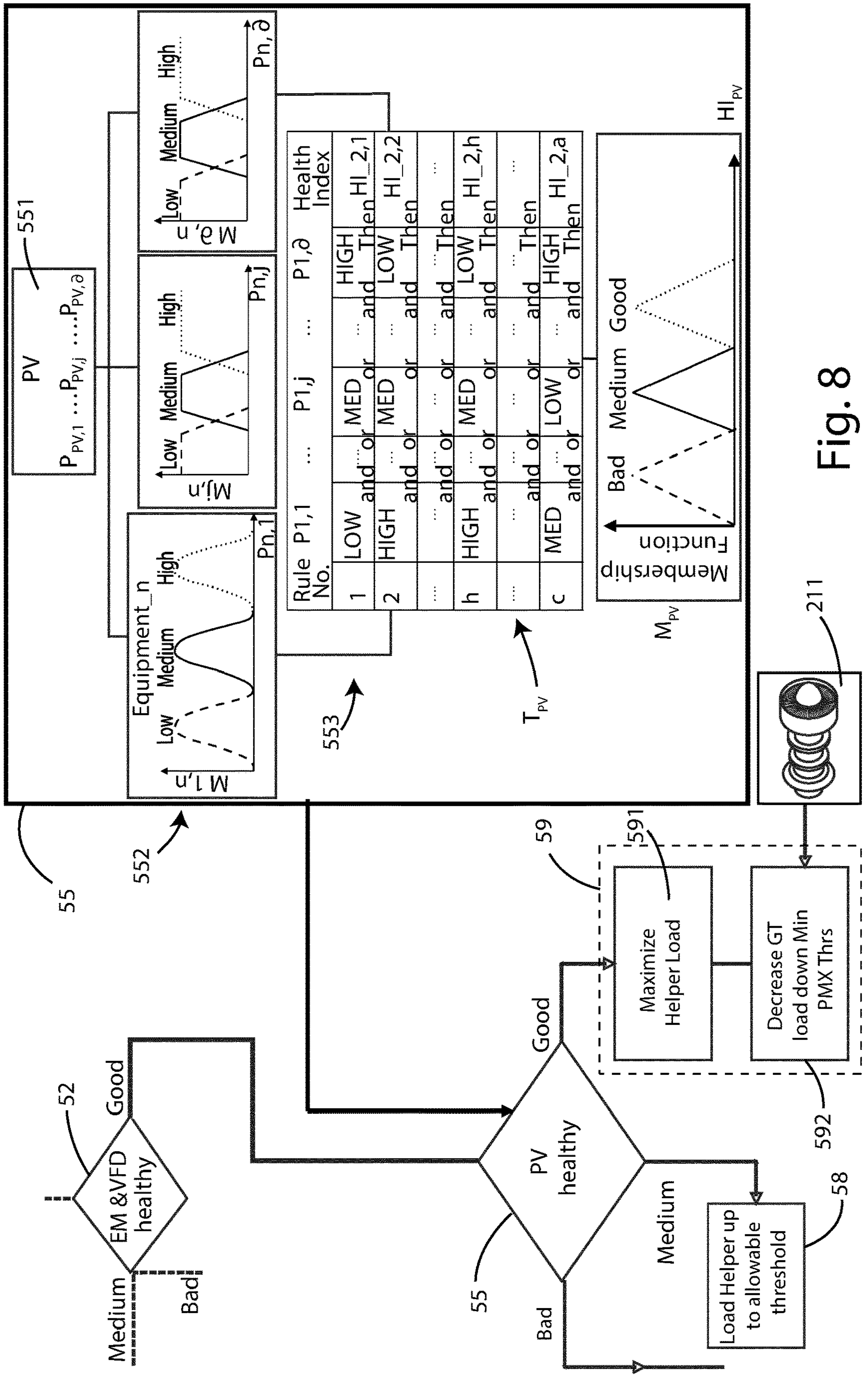
FIG. 8 illustrates a flow chart of a second conditional statement of the method of controlling the renewable energies use, according to the first embodiment.

In this case, a second conditional statement is carried out (step 55), to determine the photovoltaic source PV health indexes $HI_{pv,j}$, or in general the health index of any renewable energy sources. Specifically, referring to FIG. 8, the sub-steps of the conditional statement subprocess 55 are shown. There can be more than one parameter $P_{pv,j}$ (see sub-step 551), that are counted by the index j. Each parameter $P_{pv,j}$ has a specific signal and a true table $T_{pv}$, referred to the equipment at issue, namely the photovoltaic source PV. The true table $T_{pv}$ allow the application of proper combination rules among the parameter signals $P_{pv,j}$ of the photovoltaic plant PV, so as to calculate the health index $HI_{pv}$ of the same and determine the membership function $M_{pv}$ of the photovoltaic source PV, which can assume three qualification states, Bad, Medium, or Good.

Figure 9:
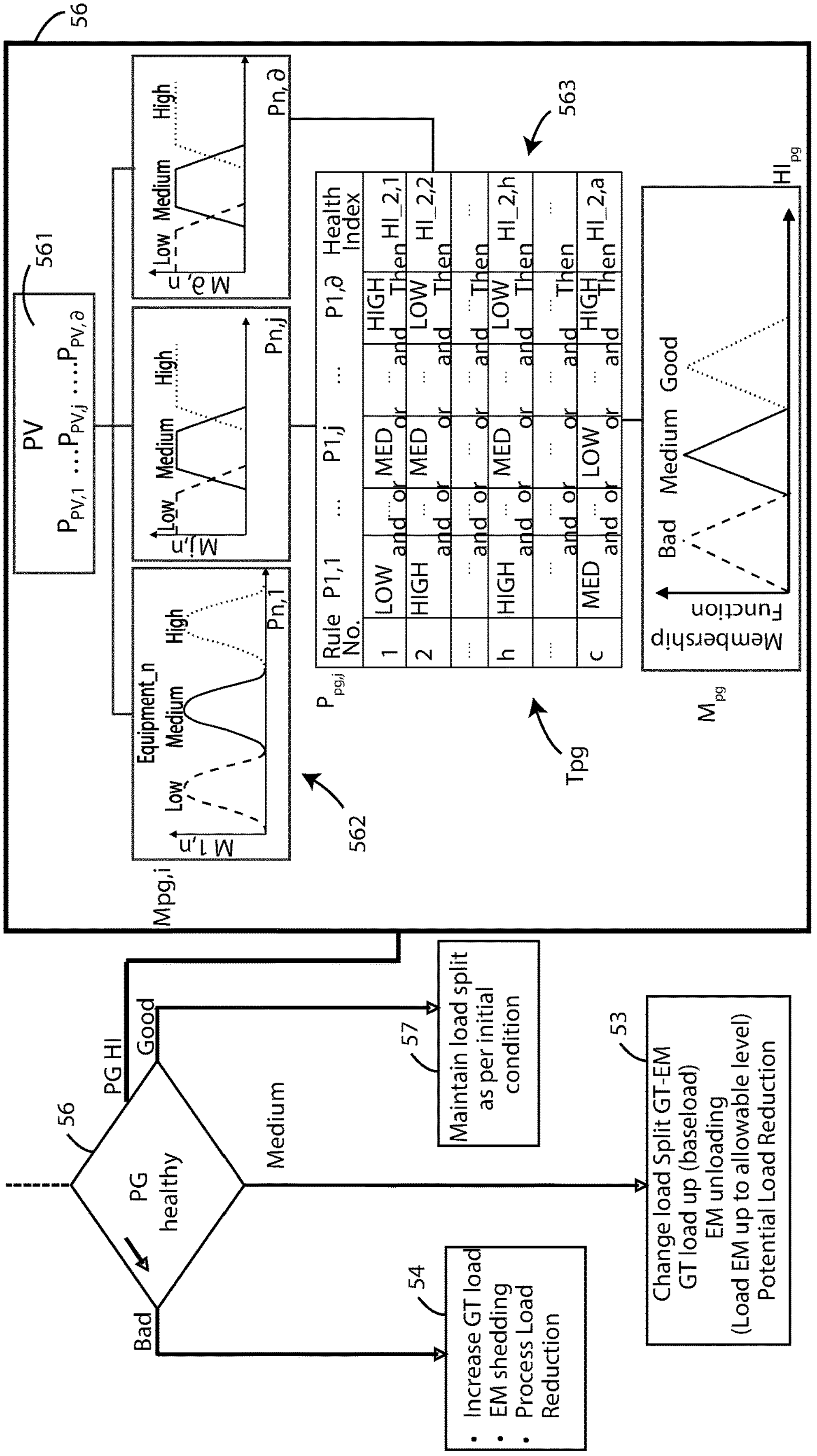
FIG. 9 illustrates a flow chart of a third conditional statement of the method of controlling the renewable energies use, according to the first embodiment.

In case of the membership function $M_{pv}$ of the photovoltaic source PV assumes the value Bad, the photovoltaic source PV does not work in a proper way, then the power generation unit PG is checked by carrying out a third conditional statement subprocess 56, which is also shown in FIG. 9. The operating check of the power generation unit PG is carried out, from a procedural standpoint, analogous to that of the photovoltaic plant 55.

FIG. 9 shows the sub-steps of the third conditional statement 56. Also, in this case, there can be more than one parameter $P_{pg,j}$ (see sub-step 561), likewise, the photovoltaic plant PV, that is counted by the index j. Each parameter $P_{pg,j}$ is associated to a parametric membership function $M_{pg,j}$ (step 562) has a specific signal and a true table $T_{pg}$ (step 563), referred to the equipment at issue, namely the power generation plant PG. The true table $T_{pg}$ allow the application of proper combination rules among the parameter signals $P_{pg,j}$ of the power generation plant PG, to calculate the health index $HI_{pg,j}$ for each parameter signals $P_{pg,j}$, and then membership function $M_{pg}$ of the power generation plant PG, which can assume three qualification states, Bad, Medium, or Good.

If the qualification state of the membership function $M_{pg}$ is Bad, then the load split is changed (go to step 53), thus the gas turbine 21 load is increased, the electric motor/generator is shed and the entire process load is reduced.

If the value of the membership function $M_{pg}$ is Medium, then the step 54 is carried out by the plant control unit 4, namely, the load split between the gas turbine and the electric motor/generator 22 is changed. In some circumstances, the processing load can be also reduced. In this case, it is also communicated by the plant control unit 4 the status process to regulate the overall train load based on gas turbine 21—electric motor/generator 22 load capability.

Finally, if the value of the membership function $M_{pg}$ is Good, then the load split is maintained as per initial conditions (step 57).

Coming back to step 55, namely the second conditional statement 5, if the membership function $M_{pv}$ of the photovoltaic plant PV assumes the value Medium, then the load of the electric motor/generator 22 is increased to operate as helper, up to an allowable presettable threshold (step 58).

Finally, if the membership function $M_{pv}$ of the photovoltaic plant PV assumes the value Good, then a rearrangement or different split (step 59) of the power generated by the electric motor/generator 22 and the gas turbine 21 is achieved. Specifically, the electric motor/generator 22 is operated to maximize the load as helper (step 591), namely the operation of the electric motor/generator 22 and the gas turbine 21 load is decreased (step 592) down to the value of the "Premix" transfer threshold $Pmx_{Load}$. Also, it is achieved the objective function of minimizing the use of the gas turbine 21. Such objective function can be expressed by the formula (F2) mentioned above.

An advantage of the solution disclosed is that of optimizing the efficiency of the train when typical intermittency and cyclicity of renewable energy is taken in consideration An additional advantage of the solution disclosed is that of ensuring that availability of the LNG trains is optimized, analyzing healthiness of the electric motor/generator, the viable frequency device and of the gas turbine, and acting on power balance to reduce risks of loss of production.

In addition, through the solution disclosed it's possible to optimize the emission of pollutants, ensuring $CO_2$ (produced at system level plus Fuel) and $NO_x$ and CO (produced at combustion level) production are minimized. This is also achieved by blending between renewable sources and conventional.

In addition, the solution disclosed allows optimizing the overall cost of liquefled natural gas production, taking in consideration the cost of fuel and the cost of renewable energy. This is also achieved by recognizing equipment health status and aging for maintenance scheduling and plant availability optimization. Equipment under analysis are generator, motors, variable frequency devices (i.e., partial discharge, dedicated instrumentation installed). In particular, equipment data monitoring and analysis (real-time or post-processing) allow recognizing and optimizing operative conditions that may affect production.

Recognize VFD's and motor's health statuses for maintenance scheduling and optimize the plant availability.

Gas turbine operating profile optimization to minimize pollutants in general, not limited to CO2 but considering also $NO_x$.

An additional advantage of the present disclosure is that of reducing the carbon intensity of an LNG plant from 10% to 15% with no impact on production, availability, and reliability, only by optimization of the trains' operation, and increasing flexibility in hot gas parts' management.

Another advantage of the method disclosed in that it makes renewable power storage optional (LNG process consumes energy produced), maximizing renewable RTE, through advanced control of the LNG train, combined with the architecture of the train itself, so as to substantially optimize RTE of the renewable utilization and CAPEX of the renewable source.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A power plant, comprising:
a load;
a hybrid power train having:
a through shaft mechanically connected to the load,
a gas turbine mechanically connected to the shaft; and
an electric motor/generator mechanically connected to the shaft;
a variable frequency device connected to the electric motor/generator, a power generation plant, and a renewable energy source, wherein the variable frequency device is operable to allow the electric motor/generator transforming the energy from the power generation plant and the renewable energy source to drive the load or to help the operation of the gas turbine; and
a plant control unit operably connected to the gas turbine, the electric motor/generator, and the variable frequency device,
wherein the plant control unit is configured to control the hybrid power train in response to health indexes for each of the gas turbine, the electric motor/generator, and the variable frequency device to maximize the energy used from the renewable energy source by increasing the driving load of the electric motor/generator and
wherein the load of the gas turbine is kept above the combustor premix transfer threshold ($Pmx_{Load}$).

2. The power plant according to claim 1, wherein the combustor premix transfer threshold ($Pmx_{Load}$) includes a load margin ($\Delta_{Load}$).

3. The power plant according to claim 1, wherein the plant control unit comprises:
a processor;
a bus, to which the processor is connected to;
a database, connected to the bus, so as to be accessed and controlled by the processor;
a computer-readable memory, connected to the bus, so as to be accessed and controlled by the processor, a receiving-transmitting module, connected to the bus, for receiving and transmitting data and signals from/to the hybrid power train.

4. The power plant according to claim 1, wherein the renewable energy source is a photovoltaic plant (PV), a wind plant, a concentrated solar power system.

5. The power plant according to claim 1, wherein the load comprises one or more centrifugal compressors for refrigerating natural gas.

6. The power plant according to claim 1, wherein the load comprises a pump.

7. The power plant according to claim 1, wherein the health indexes relate to a status for the hybrid power train.

8. The power plant according to claim 1, wherein the plant control unit is configured to execute a computer program with steps for detecting, in real-time, conditions on the hybrid power train.

9. The power plant according to claim 1, wherein the plant control unit is configured to execute a computer program with steps for:

receiving input parameters from each of the gas turbine, the electric motor/generator, and the variable frequency device.

10. The power plant according to claim 1, wherein the plant control unit is configured to execute a computer program with steps for:

receiving input parameters from each of the gas turbine, the electric motor/generator, and the variable frequency device, assigning a parametric membership function, and using the parametric membership function to obtain the health indexes for the gas turbine, the electric motor/generator/and the variable frequency device.

11. The power plant according to claim 1, wherein the plant control unit is configured to execute a computer program with steps for:

receiving input parameters from each of the gas turbine, the electric motor/generator, and the variable frequency device, assigning a logic state function with values that correspond with a condition for the gas turbine, the electric motor/generator/and the variable frequency device, and using the logic state function to obtain the health indexes for the gas turbine, the electric motor/generator/and the variable frequency device.

12. The power plant according to claim 1, wherein the plant control unit is configured to execute a computer program with steps for:

receiving input parameters from each of the gas turbine, the electric motor/generator, and the variable frequency device, assigning a parametric membership function comprising a logic state function with possible values that correspond with a condition for the gas turbine, the electric motor/generator/and the variable frequency device, and using the parametric membership function to obtain the health indexes for the gas turbine, the electric motor/generator/and the variable frequency device.

13. The power plant according to claim 1, wherein the plant control unit is configured to execute a computer program with steps for:

receiving input parameters from each of the gas turbine, the electric motor/generator, and the variable frequency device, assigning a parametric membership function comprising a logic state function with possible values that correspond with a condition for the gas turbine, the electric motor/generator and the variable frequency device, using the parametric membership function to obtain the health index for the gas turbine, the electric motor/generator/and the variable frequency device, and using the health indexes, determining an equipment membership function for the electric motor/generator.

14. The power plant according to claim 1, wherein the plant control unit is configured to execute a computer program with steps for:

receiving input parameters from each of the gas turbine, the electric motor/generator, and the variable frequency device, assigning a parametric membership function comprising a logic state function with possible values that correspond with a condition for the gas turbine, the electric motor/generator/and the variable frequency device, using the parametric membership function to obtain the health index for the gas turbine, the electric motor/generator and the variable frequency device, and using the health indexes, determining an equipment membership function for the gas turbine.

* * * * *